United States Patent
Wolf et al.

(10) Patent No.: US 9,856,955 B2
(45) Date of Patent: *Jan. 2, 2018

(54) STARTER GENERATOR BELT TENSIONER

(71) Applicant: Schaeffler Technologies AG & Co. KG, Herzogenaurach (DE)

(72) Inventors: Benjamin Wolf, Bubenreuth (DE); Wolfgang Lorz, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,287

(22) Filed: Aug. 11, 2016

(65) Prior Publication Data
US 2016/0363197 A1 Dec. 15, 2016

Related U.S. Application Data

(63) Continuation of application No. 14/767,145, filed as application No. PCT/US2013/000359 on Dec. 11, 2013, now Pat. No. 9,625,013.

(30) Foreign Application Priority Data

Feb. 22, 2013 (DE) ........................ 10 2013 002 993

(51) Int. Cl.
*F16H 7/12* (2006.01)
*F16H 7/08* (2006.01)

(52) U.S. Cl.
CPC ... *F16H 7/1281* (2013.01); *F16H 2007/0806* (2013.01); *F16H 2007/0878* (2013.01)

(58) Field of Classification Search
CPC ........... F16H 2007/0874; F16H 7/1281; F16H 2007/081; F16H 2007/0806; F16H 2007/0893

(Continued)

(56) References Cited

U.S. PATENT DOCUMENTS 976,115 A * 11/1910 Bard .............................. 180/443
1,557,486 A * 10/1925 Valentine .............. F16H 7/1281
474/135

(Continued)

FOREIGN PATENT DOCUMENTS

DE 19926615 12/2000
DE 102006019877 10/2007

(Continued)

*Primary Examiner* — Henry Liu
(74) *Attorney, Agent, or Firm* — Volpe and Koenig, P.C.

(57) ABSTRACT

A generator belt drive of an internal combustion engine, having a generator arrangement with a generator (1) having a belt pulley (6) and a belt tensioner (2). The generator arrangement includes the following: —a first tensioning lever (8) with a first tensioning roller (4), —a second tensioning lever (9) with a second tensioning roller, these tensioning rollers being arranged in front of and behind the belt pulley in a circulating direction of the belt (3) and applying a pretensioning force onto the belt, —a spring (7) arranged between the tensioning levers and which moves the tensioning rollers towards each other, thereby generating the pretensioning force, —and a locking arrangement (11), by which the tensioning levers can be locked relative to each other in a position in which the tensioning rollers are moved away from each other, thereby reducing or canceling the pretensioning force. The generator arrangement also includes an additional locking element by which one of the tensioning levers can be locked relative to the generator that either—is a starter generator (1) and the generator belt drive has a decoupler that is arranged on the generator or on a crankshaft of the internal combustion engine and decouples a rotating starter generator mass from the crankshaft with the support of the belt tensioner, —or has no starter mode.

11 Claims, 2 Drawing Sheets

(58) Field of Classification Search
USPC .................................................. 474/134
See application file for complete search history.

(56) References Cited

U.S. PATENT DOCUMENTS

| | | | | |
|---|---|---|---|---|
| 3,473,399 A * | 10/1969 | Buchwald | ............... | F02B 67/06 474/137 |
| 3,888,217 A * | 6/1975 | Hisserich | ............... | F01L 1/024 123/90.15 |
| 4,351,636 A * | 9/1982 | Hager | ............... | F02B 67/06 474/135 |
| 4,758,208 A * | 7/1988 | Bartos | ............... | F16H 7/1281 474/111 |
| 4,826,471 A * | 5/1989 | Ushio | ............... | F16H 7/1281 474/135 |
| 4,981,116 A * | 1/1991 | Trinquard | ............... | F02B 67/06 123/90.31 |
| 5,045,029 A * | 9/1991 | Dec | ............... | F16H 7/1218 474/112 |
| 5,045,031 A * | 9/1991 | Thomey | ............... | F16H 7/1218 474/138 |
| 5,083,983 A * | 1/1992 | Hirai | ............... | F16H 7/1218 474/135 |
| 5,377,796 A * | 1/1995 | Friedmann | ............... | F16F 15/13423 192/213 |
| 6,648,783 B1 * | 11/2003 | Bogner | ............... | F16H 7/1281 474/134 |
| 6,689,001 B2 * | 2/2004 | Oliver | ............... | F16H 7/1281 474/109 |
| 6,830,524 B2 * | 12/2004 | Tamai | ............... | F16H 7/1281 474/111 |
| 6,857,979 B2 * | 2/2005 | Macnaughton | ............... | F16H 7/1218 474/101 |
| 7,468,013 B2 * | 12/2008 | Di Giacomo | ............... | F16H 7/1281 474/117 |
| 7,494,434 B2 * | 2/2009 | McVicar | ............... | F16H 7/1281 474/101 |
| 7,678,001 B2 * | 3/2010 | Seeber | ............... | B21J 13/12 474/101 |
| 7,682,272 B2 * | 3/2010 | Park | ............... | H02K 15/165 474/137 |
| 7,824,286 B2 * | 11/2010 | Schmid | ............... | F16H 7/1263 411/546 |
| 7,892,125 B2 * | 2/2011 | Nelson | ............... | F16H 7/1254 474/101 |
| 8,002,657 B2 * | 8/2011 | Antchak | ............... | F16H 7/1218 474/101 |
| 8,602,930 B2 * | 12/2013 | Deneszczuk | ............... | F16H 7/1281 474/112 |
| 8,821,328 B2 * | 9/2014 | Jud | ............... | F16H 7/1281 474/134 |
| 8,968,128 B2 * | 3/2015 | Wolf | ............... | F16H 7/1281 474/135 |
| 2002/0039944 A1 * | 4/2002 | Ali | ............... | F16H 7/1209 474/135 |
| 2002/0086751 A1 * | 7/2002 | Bogner | ............... | F02B 63/04 474/134 |
| 2003/0109342 A1 * | 6/2003 | Oliver | ............... | F16H 7/1281 474/134 |
| 2003/0216203 A1 * | 11/2003 | Oliver | ............... | F16H 7/1281 474/134 |
| 2006/0100051 A1 * | 5/2006 | Di Giacomo | ............... | F16G 1/28 474/170 |
| 2006/0217222 A1 * | 9/2006 | Lolli | ............... | F16H 7/1281 474/134 |
| 2006/0240926 A1 * | 10/2006 | Wiesneth | ............... | F02B 67/06 474/166 |
| 2007/0037648 A1 * | 2/2007 | Di Giacomo | ............... | F16H 7/1281 474/134 |
| 2008/0220919 A1 * | 9/2008 | Antchak | ............... | F16H 7/1218 474/135 |
| 2009/0215564 A1 * | 8/2009 | Pflug | ............... | F16H 7/1281 474/135 |
| 2009/0275432 A1 * | 11/2009 | Dell | ............... | F16H 7/1218 474/135 |
| 2009/0298631 A1 * | 12/2009 | Jud | ............... | F16H 7/1281 474/237 |
| 2010/0022340 A1 * | 1/2010 | Schmidl | ............... | F16H 7/1281 474/135 |
| 2010/0331127 A1 * | 12/2010 | Dec | ............... | F16H 7/1218 474/135 |
| 2011/0065537 A1 * | 3/2011 | Serkh | ............... | F16D 7/022 474/94 |
| 2011/0070985 A1 * | 3/2011 | Deneszczuk | ............... | F16H 7/1281 474/135 |
| 2011/0070986 A1 * | 3/2011 | Maguire | ............... | F02B 67/06 474/135 |
| 2011/0224038 A1 * | 9/2011 | Aantchak | ............... | F16D 7/022 474/94 |
| 2012/0004059 A1 * | 1/2012 | Ma | ............... | F16H 7/1218 474/135 |
| 2013/0040770 A1 * | 2/2013 | Wolf | ............... | F16H 7/1281 474/134 |
| 2013/0079185 A1 * | 3/2013 | Schauerte | ............... | F16H 7/1281 474/135 |
| 2013/0095967 A1 * | 4/2013 | Wolf | ............... | F16H 7/1281 474/135 |
| 2013/0203535 A1 * | 8/2013 | Mack | ............... | F16H 7/1281 474/134 |
| 2013/0237351 A1 * | 9/2013 | Marion | ............... | B60K 25/02 474/70 |
| 2014/0076683 A1 * | 3/2014 | Williams | ............... | B60K 25/02 192/41 S |
| 2015/0345597 A1 * | 12/2015 | Walter | ............... | F16H 7/1218 474/134 |

FOREIGN PATENT DOCUMENTS

| | | |
|---|---|---|
| DE | 102008025552 | 12/2009 |
| DE | 102011082764 | 4/2012 |
| DE | 102011084680 | 11/2012 |
| EP | 2154394 | 10/2011 |
| EP | 2557295 | 2/2013 |

* cited by examiner

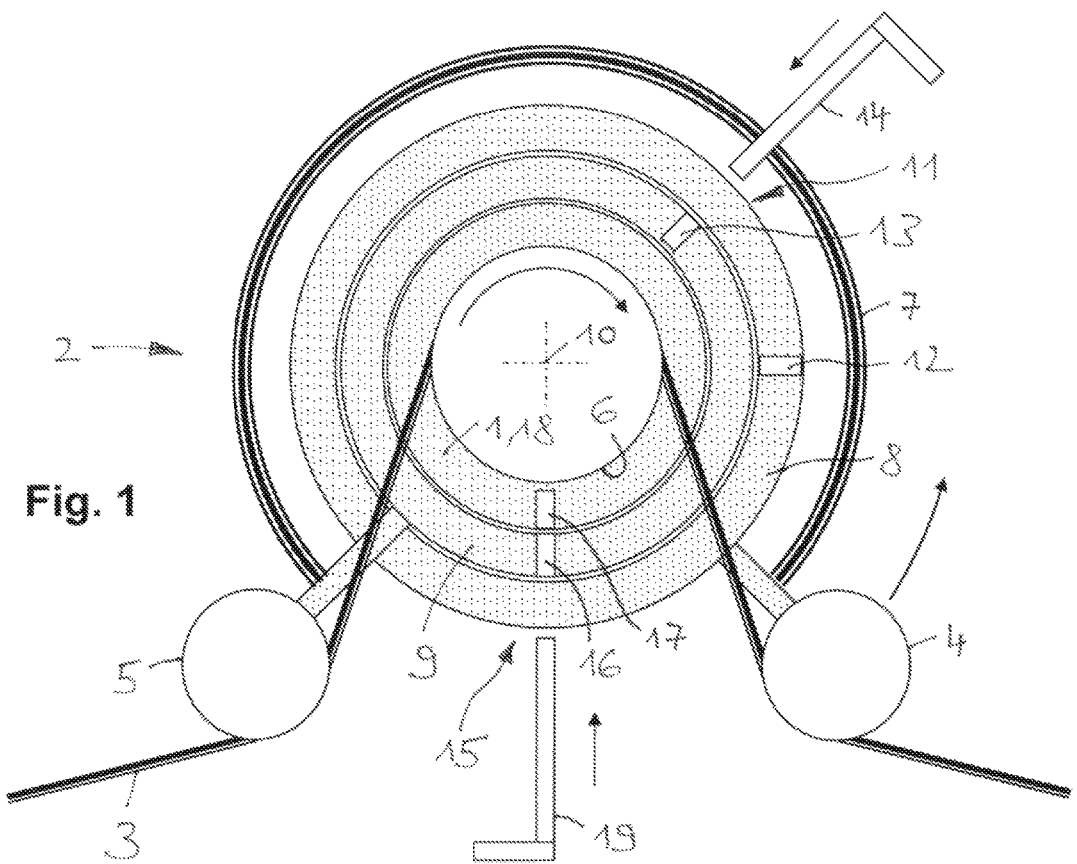
Fig. 1
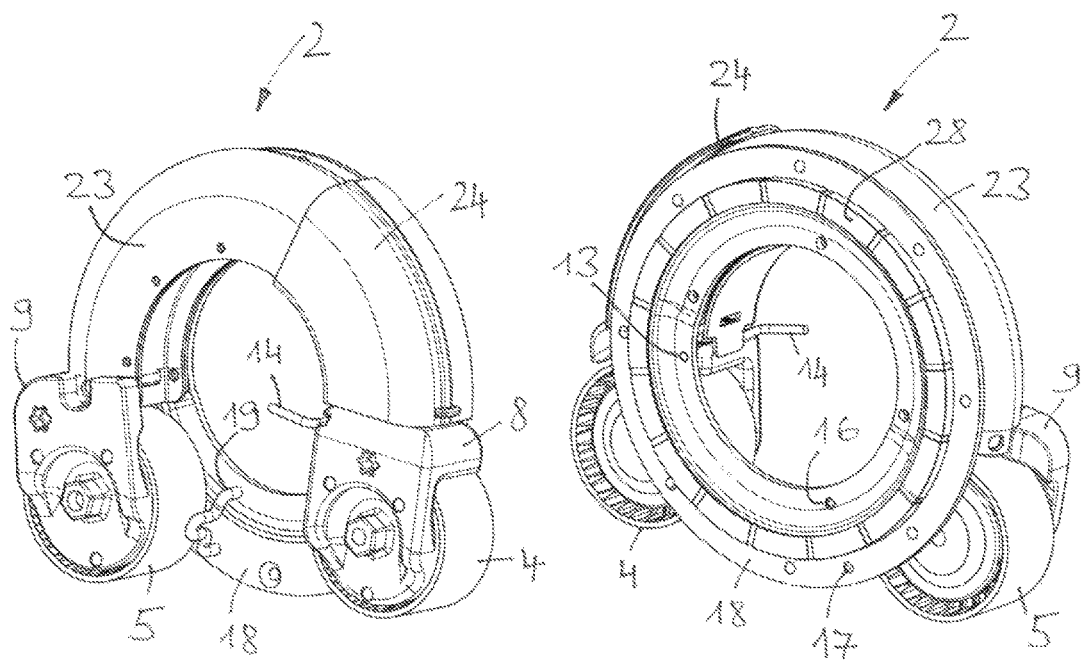
Fig. 2
Fig. 3

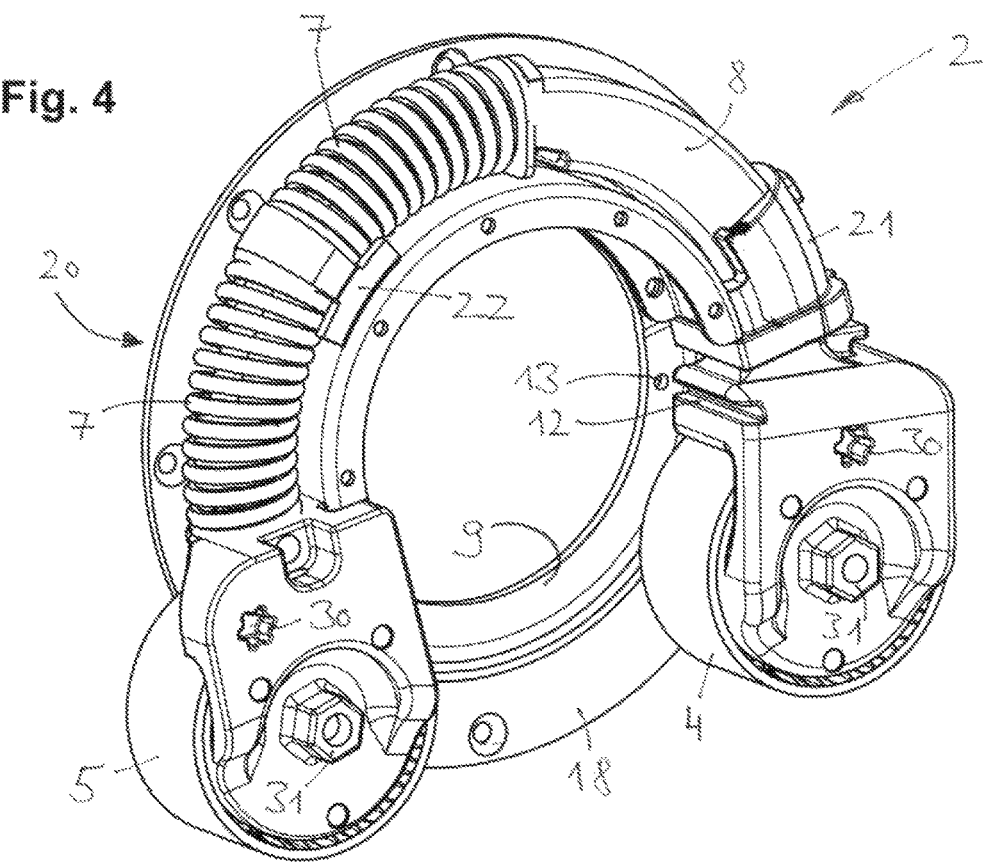
Fig. 4
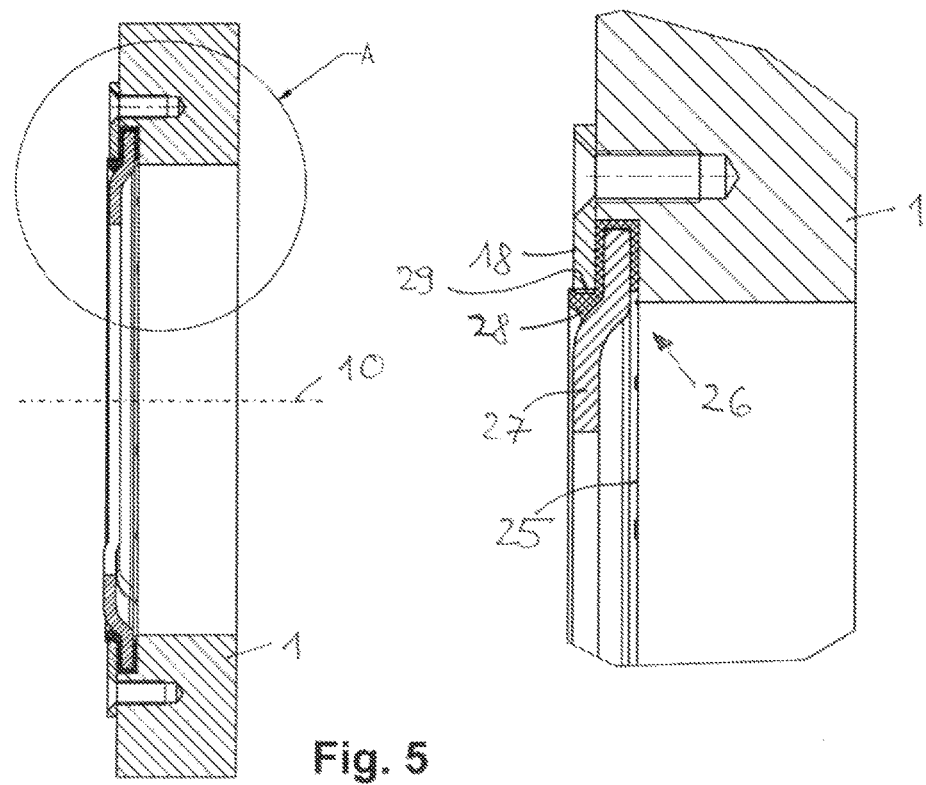
Fig. 5
Fig. 6

STARTER GENERATOR BELT TENSIONER

INCORPORATION BY REFERENCE

The following documents are incorporated herein by reference as if fully set forth: U.S. patent application Ser. No. 14/767,145, filed Aug. 11, 2015.

FIELD OF THE INVENTION

The invention relates to a generator arrangement for an auxiliary unit belt drive of an internal combustion engine. The generator arrangement has a starter generator with a belt pulley and a belt tensioner, wherein this starter generator comprises the following:
  a first tensioning lever with a first tensioning roller,
  a second tensioning lever with a second tensioning roller, wherein the tensioning rollers are arranged in front of and behind the belt pulley in the circulating direction of the belt and apply a pretensioning force on the belt,
  a spring element that is tensioned between the tensioning levers and moves the tensioning rollers toward each other while generating the pretensioning force,
  and a locking means by which the tensioning levers can be locked relative to each other in a position in which the tensioning rollers are moved away from each other while reducing or increasing the pretensioning force.

BACKGROUND

A starter generator that is arranged in the auxiliary unit belt drive of an internal combustion engine causes, with its belt pulley alternately receiving and discharging torque, i.e., for a generator mode and a starter mode for the internal combustion engine, a corresponding switching of the tensioned section and slack section of the circulating belt. Therefore, the tensioning of the slack section requires a belt tensioner with two tensioning rollers that pretension the belt in front of and behind the belt pulley.

Known belt tensioners, as proposed, for example, in DE 199 26 615 A1, DE 10 2008 025 552 A1, and DE 10 2006 019 877 A1, each have a tensioner housing mounted on the starter generator and two tensioning levers that are supported so that they can move in this housing and whose tensioning rollers are moved by force toward each other by a spring element arranged there-between in order to tension the belt.

A belt tensioner according to the class is known from DE 10 2011 084 680 B3. This belt tensioner has a tensioning lever in the form of a tensioner housing that can be rotated by means of the belt pulley of the starter generator with a tensioning roller mounted fixed to the housing. The tensioner housing accommodates a bow spring and the other tensioning lever that can move against its spring force. For the simplest possible belt drive assembly, it is necessary that the two tensioning rollers are moved away from each other relative to their operating position and are locked in this set-apart position against the force of the spring that is greatly pretensioned in this position, in order to be able to place the belt during the initial assembly or to replace it in the event of servicing. The mutual locking of the two tensioning levers is realized by a securing pin that is then inserted into holes brought into alignment with each other in the tensioner housing and in the tensioner lever mounted in this housing.

Starting from this background, the present invention is based on the objective of improving a generator arrangement of the type named above and a belt tensioner for forming such a generator arrangement with respect to the belt drive assembly.

SUMMARY

This objective is achieved from one or more features of the invention. Accordingly, the generator arrangement should comprise an additional locking means by means of which one of the tensioning levers can be locked relative to the starter generator. The generator-side part of the additional locking means can be constructed either indirectly on the housing of the starter generator or on a separate component that is mounted on the generator housing. The latter construction is provided according to another feature of the invention, according to which one of the tensioning levers can be locked by means of the additional locking means relative to a connection element that is mounted on the starter generator for holding the belt tensioner.

The additional locking leads to a considerable simplification of the belt drive assembly. This applies especially for the case that the belt tensioner is unloaded from force to a maximum degree due to a torn belt. Here, the prerequisite for the unimpaired placement of a new belt is that the tensioning levers are locked relative to each other in the position in which the tensioning rollers are sufficiently far away from each other. However, in order to move the tensioning rollers from the maximum unloaded position into this locking position, the mechanic performing the task needs both hands, because the two tensioning rollers can be moved away from each other into the locking position only at the same time—otherwise both tensioning levers would merely be rotated together in a loop because of the (still) missing belt support. This procedure would then require a second mechanic, who sets the locking means in the spaced-apart position of the two tensioning rollers.

In contrast, the additional locking means replaces the missing belt support in that one of the tensioning levers is rotationally locked relative to the starter generator. Now, the mechanic can rotate the other tensioning lever into the locking position with one hand and set the locking means just using his or her second hand by itself. Accordingly, the additional locking means can be disengaged to be able to rotate the belt tensioner back and forth as a single unit blocked with the tensioning rollers set at a distance to each other when placing the new belt.

The locking means can be formed, for example, for transport purposes, completely on each generator arrangement or each belt tensioner. This is not necessarily required, however. Because the locking means can also be limited to a suitable shaping of the components to be locked relative to each other, wherein then for the locking means, a matching tool is required. In particular, one or both locking means can comprise two recesses or holes that can move in a locking position, wherein a locking pin can be inserted into each of these recesses or holes in the locking position (i.e., not yet inserted tool) or can already be inserted in a delivered part.

BRIEF DESCRIPTION OF THE DRAWINGS

Additional features of the invention are given from the following description and from the drawings that show a schematic diagram and a constructed belt tensioner for forming a generator arrangement according to the invention. If not mentioned otherwise, features or components that are identical or have identical functions are provided with identical reference numbers. Shown are:

FIG. 1 the schematic diagram,

FIG. 2 the belt tensioner in perspective front view,

FIG. 3 the belt tensioner in perspective rear view,

FIG. 4 the belt tensioner with tensioner housing shown open,

FIG. 5 the rotational support of the belt tensioner on the starter generator in isolated cross-sectional representation, FIG. 6 the detail A from FIG. 5.

DETAILED DESCRIPTION OF THE PREFERRED EMBODIMENTS

FIG. 1 is a schematic diagram of a generator arrangement according to the invention for an auxiliary unit belt drive of an internal combustion engine. Here, a starter generator 1 and a belt tensioner 2 supported on the front side are assembled into one structural unit. Because, as is known, the position of the tensioned section and the slack section in the poly-V belt 3 changes with the operating mode of the starter generator 1, the belt tensioner is equipped with two tensioning rollers 4 and 5 that are arranged in front of and behind the belt pulley 6 of the starter generator in the circulating direction of the belt and alternately apply a pretensioning force to the current slack section of the belt. The pretensioning force is generated by a spring element 7 that is clamped between two tensioning levers 8 and 9 that are to move the tensioning rollers supported thereon toward each other due to the spring force. The two tensioning levers are supported so that they can rotate concentric to the rotational axis 10, wherein kinematics deviating herefrom also exist without affecting the shown principle.

The belt tensioner 2 is equipped with a locking means 11 that makes it possible to lock the two tensioning levers 8, 9 relative to each other in a position in which the tensioning rollers 4, 5 are moved away from each other while completely or to a large extent unloading the belt 3. For this purpose the first tensioning lever 8 is rotated in the counterclockwise direction in the drawn relative rotational direction until a hole 12 in the first tensioning lever and a hole 13 in the second tensioning lever 9 are aligned with each other. In this locking position, a locking pin 14 that tensions the two tensioning levers relative to each other with the force of the spring element 7 under a strong pretensioning force in this position is inserted into the holes.

With the relative rotation of the two tensioning levers 8, 9 in the locking position, either the first tensioning lever 8 can be rotated in the shown counterclockwise direction, while the second tensioning lever 9 with the second tensioning roller 5 is supported on the belt 3. Conversely, the second tensioning lever 9 could also be rotated in the clockwise direction, while the first tensioning lever with the first tensioning roller 4 is supported on the belt. This support, however, does not exist if the belt is not there, for example, if it has torn or fallen off. For this case, the generator arrangement comprises an additional locking means 15 that enables a locking of one of the tensioning levers relative to the starter generator 1. In the shown case, the second tensioning lever is provided with a hole 16 that aligns in the locking position with a hole 17 in a generator-fixed part 18. The additional locking is realized with an additional locking pin 19 that is inserted into the holes 16, 17. In the unplugged state of the second tensioning lever, a mechanic can rotate and hold by himself or herself the first tensioning lever with one hand up to its locking position and insert the locking pin 14 with his or her other hand.

The generator-fixed part 18 can be the housing of the starter generator 1 or a connection element that is mounted on the starter generator and holds the belt tensioner 2 so that it can rotate on the starter generator, as is the case in the embodiment explained farther below. As an alternative to the representation, the additional locking means can also comprise a hole in the first tensioning lever 8 instead of the hole 16 in the second tensioning lever 9. In this case, the first tensioning lever would be locked relative to the starter generator so that for locking the two tensioning levers with each other, the second tensioning lever must be rotated in the clockwise direction into the locking position.

The holes 16, 17 forming the additional locking means 15 are positioned relative to each other so that, when the belt drive is at rest and when the belt 3 is tensioned uniformly over its entire length, they remain in the proximity of their locking position. This has the effect that the holes 16, 17 are automatically moved toward each other in the direction of their locking position when the internal combustion engine is stopped and the belt section forces are equalized, so that the second tensioning lever 9 can be unplugged without a large expenditure of rotational effort on the starter generator 1 or on the generator-fixed component 18.

As in FIG. 1, the belt tensioner 2 shown in FIGS. 2 to 4 are provided for front-side assembly on a starter generator not shown here. The first tensioning lever 8 is constructed as a circular arc-shaped tensioning arm that is loaded with force on one end by the spring element 7 in the form of two bow springs connected in series and supports the first tensioning roller 4 on the other end. The second tensioning lever 9 forms a circular ring-shaped tensioner housing with a circular arc-shaped cavity 20 in which the bow springs 7 and one end of the tensioning arm 8 are supported so that they can rotate in the plane of the circular arc. This support is realized by means of a housing-fixed first bearing shell 21 that surrounds the tensioning arm and a second bearing shell 22 that is supported so that it can move in the tensioner housing 9 and is clamped between the two bow springs 7 and supports a mandrel projection of the tensioning arm running in the interior of the bow springs (not visible here). The second tensioning roller 5 is supported fixed in position on the tensioner housing. The cavity is closed by a housing part 23 excluded from FIG. 4. A plastic shell 24 set on the housing part is used as injection protection of the tensioning arm support.

As can be seen from FIGS. 5 and 6, the tensioner housing 9 is supported so that it can rotate on an end face 25 of the starter generator 1 concentric to the generator axis 10. This allows the tensioner housing 9 with the tensioning rollers 4, 5 to pivot about the generator axis in the event of an operating mode change in the starter generator 1 and a corresponding change of the tensioned section and slack section in the belt 3. If, for example, the starter generator 1 changes from starter mode to generator mode, then the belt section on the side of the first tensioning roller 4 changes from slack section to tensioned section and on the side of the second tensioning roller 5 from tensioned section to slack section. Consequently, this operating mode change leads to a pivoting of the tensioner housing from the tensioned section at the time on the side of the first tensioning roller into the slack section at the time on the side of the second tensioning roller, i.e., for the circulating direction shown in FIG. 1 for the belt to a pivoting in the counterclockwise direction. Here, the pretensioning force in the belt is always maintained by the bow springs 7 that apply compressive force on the tensioning arm 8 from the tensioner housing.

This operation of the belt tensioner 2, i.e., the tensioning oscillations in the slack section at the time, causes a so-called decoupling of the rotating starter generator mass from the crankshaft of the internal combustion engine. This decoupling typically takes over a decoupler on the generator (e.g., a generator flywheel) or on the crankshaft that is arranged in conventional generator machines without a starter mode on the generator or on the crankshaft and decouples the comparatively delayed rotating generator mass from the crankshaft when its rotational speed gradient is negative. In other words, the belt tensioner 2 according to the invention can also be used for conventional generator belt drives (without starter mode) as an alternative to or in addition to the decoupler.

The rotational support of the tensioner housing 9 is realized by a circular ring-shaped sliding bearing 26 that contacts, on one side, the end face 25 of the starter generator 1 and, on the other side, the connection element 18 connected rigidly and here screwed to the starter generator in the form of a ring flange that holds the tensioner housing on the starter generator. The sliding bearing supporting axial and radial forces comprises a metal ring 27 that forms part of the tensioner housing and is surrounded on the end and peripheral sides by a bearing ring 28 made from sliding bearing plastic. The transport securing device of the ring flange 18 in the unassembled belt tensioner 2 is realized by a snap-on connection in the form of a ring groove 29 that surrounds the bearing ring and in which the ring flange is snapped with its inner periphery.

FIGS. 2 and 3 show the belt tensioner 2 in complete, i.e., twice locked state. The tensioning arm 8 is inserted as much as possible in the tensioner housing 9 and locked in this position. The mutual distance of the two tensioning rollers 4 and 5 is so large that an unimpaired assembly of the belt 3 in the belt drive is possible. The tensioner housing is locked relative to the generator-fixed ring flange 18. The locking of the tensioning arm relative to the tensioner housing is realized by means of the locking pin 14 that is inserted on the side of the tensioning arm in a recess 12 (see FIG. 4 without locking pin) and on the side of the tensioner housing in the hole 13 aligned with the recess 12. The additional locking of the tensioner housing with the ring flange comprises two axially offset holes 16 in the tensioner housing 17 in the ring flange and a securing clip 19 inserted therein.

The rotation of the tensioning arm and the tensioner housing into the locking positions can be realized by standard tools. For this purpose, the bearing carriers of the tensioning rollers 4, 5 are each provided with an internal torx receptacle 30 and a hexagonal bolt 31.

LIST OF REFERENCE NUMBERS

1 Starter generator
2 Belt tensioner
3 Belt
4 First tensioning roller
5 Second tensioning roller
6 Belt pulley
7 Spring element/bow spring
8 First tensioning lever/tensioning arm
9 Second tensioning lever/tensioning arm
10 Rotational axis/generator axis
11 Locking means
12 Hole/recess in first tensioning lever
13 Hole/recess in second tensioning lever
14 Locking pin
15 Additional locking means
16 Hole/recess in second tensioning lever
17 Hole/recess in generator-fixed part
18 Generator-fixed part/connection element/ring flange
19 Additional locking pin/securing clip
20 Cavity
21 First bearing shell
22 Second bearing shell
23 Housing part
24 Plastic shell
25 End face of the starter generator
26 Sliding bearing
27 Metal ring
28 Bearing ring
29 Ring groove
30 Internal torx
31 Hexagonal bolt

The invention claimed is:

1. A generator belt drive of an internal combustion engine with a generator arrangement that has a generator with a belt pulley and a belt tensioner, the generator arrangement comprises:
   a first tensioning lever with a first tensioning roller,
   a second tensioning lever with a second tensioning roller, wherein the tensioning rollers are arranged in front of and behind the belt pulley in a circulating direction of the belt and apply a pretensioning force onto the belt,
   a spring element that is tensioned between the tensioning levers and moves the tensioning rollers toward each other while generating the pretensioning force,
   and a locking element by which the tensioning levers are locked relative to each other in a position in which the tensioning rollers are moved away from each other while reducing or cancelling out the pretensioning force, and
   an additional locking element by which one of the tensioning levers is locked relative to the generator that either
   is a starter generator, wherein the generator belt drive has a decoupler that is arranged on the generator or on a crankshaft of the internal combustion engine and decouples a rotating starter generator mass from the crankshaft with the support of the belt tensioner,
   or has no starter mode.

2. The generator belt drive according to claim 1, wherein the generator has no starter mode, and the generator belt drive has a decoupler that is arranged on the generator or on the crankshaft of the internal combustion engine and decouples a rotating generator mass from the crankshaft with the support of the belt tensioner.

3. The generator belt drive according to claim 1, wherein the first tensioning lever is a circular arc-shaped tensioning arm that is loaded on one end by a force of the spring element and supports, on another end, the first tensioning roller, and the second tensioning lever forms a tensioner housing on which the second tensioning roller is supported fixed to the housing, the tensioner housing is supported so that it is rotatable concentric to the belt pulley on one end face of the generator and has a circular arc-shaped cavity in which the spring element comprising one or more bow springs and the tensioning arm are supported movably in a plane of the circular arc.

4. The generator belt drive according to claim 3, wherein the rotational support of the tensioner housing is a circular ring-shaped sliding bearing that runs on one side on the end face of the generator and on another side on a ring flange connected rigidly to the generator by which the tensioner housing is held on the generator.

5. The generator belt drive according to claim 4, wherein one or both locking elements comprise two recesses or holes that can be moved relative to each other into a locking position in which a locking pin is inserted in the locking position.

6. The generator belt drive according to claim 5, wherein the additional locking element is formed by a first hole or recess in the tensioner housing and by a second hole or recess in the ring flange axially offset relative to the first hole or recess, and the associated locking pin is a securing clip.

7. The generator belt drive according to claim 6, wherein the holes or recesses forming the additional locking elements are positioned so that the holes or recesses automatically move in a direction of the locking position when the internal combustion engine is turned off.

8. The generator belt drive according to claim 1, wherein the additional locking element locks one of the tensioning levers relative to a fixed element of the generator.

9. The generator belt drive according to claim 8, wherein the fixed element of the generator is a housing of the generator.

10. The generator belt drive according to claim 8, wherein the fixed element is a connection element which secures the belt tensioner to the generator.

11. The generator belt drive according to claim 10, wherein the connecting element is a ring flange.

* * * * *